United States Patent
Petry et al.

(10) Patent No.: US 7,962,898 B1
(45) Date of Patent: Jun. 14, 2011

(54) OPTIMIZED DISTRIBUTION OF MACHINE VISION PROCESSING

(75) Inventors: John Petry, Newton, MA (US); Cyril C. Marrion, Jr., Acton, MA (US); Andrew Eames, Ashland, MA (US)

(73) Assignee: Cognex Corporation, Natick, MA (US)

( * ) Notice: Subject to any disclaimer, the term of this patent is extended or adjusted under 35 U.S.C. 154(b) by 1119 days.

(21) Appl. No.: 09/842,948

(22) Filed: Apr. 27, 2001

Related U.S. Application Data

(63) Continuation of application No. 09/750,173, filed on Dec. 29, 2000, now abandoned.

(51) Int. Cl.
G06F 9/44 (2006.01)

(52) U.S. Cl. ...................................................... 717/124

(58) Field of Classification Search .................. 717/171, 717/120, 105, 124; 715/771, 733; 709/217; 719/319, 315; 345/520
See application file for complete search history.

(56) References Cited

U.S. PATENT DOCUMENTS

| | | | |
|---|---|---|---|
| 4,641,356 A | | 2/1987 | Sternberg |
| 4,975,972 A | | 12/1990 | Bose et al. |
| 4,985,846 A | | 1/1991 | Fallon |
| 5,040,228 A | | 8/1991 | Bose et al. |
| 5,081,529 A | * | 1/1992 | Collette .................. 358/504 |
| 5,327,265 A | * | 7/1994 | McDonald .................. 358/527 |
| 5,481,712 A | * | 1/1996 | Silver et al. .................. 717/109 |
| 5,563,720 A | * | 10/1996 | Edgar et al. .................. 358/447 |
| 5,666,215 A | * | 9/1997 | Fredlund et al. ............. 358/487 |
| 5,673,334 A | | 9/1997 | Nichani et al. |
| 5,694,484 A | * | 12/1997 | Cottrell et al. ................ 382/167 |
| 5,715,051 A | | 2/1998 | Luster |
| 5,768,401 A | | 6/1998 | Csipkes et al. |
| 5,821,993 A | | 10/1998 | Robinson |
| 5,835,627 A | * | 11/1998 | Higgins et al. ................ 382/167 |
| 5,867,322 A | * | 2/1999 | Morton ......................... 359/619 |
| 5,928,335 A | * | 7/1999 | Morita ......................... 709/203 |
| 5,982,362 A | | 11/1999 | Crater et al. |
| 6,025,854 A | | 2/2000 | Hinz et al. |
| 6,133,985 A | * | 10/2000 | Garfinkle et al. ............... 355/40 |
| 6,298,474 B1 | * | 10/2001 | Blowers et al. ............... 717/104 |
| 6,381,357 B1 | | 4/2002 | Tan et al. |
| 6,427,099 B1 | | 7/2002 | Heinemann |
| 6,493,677 B1 | * | 12/2002 | von Rosen et al. ............. 705/27 |
| 6,578,017 B1 | * | 6/2003 | Ebersole et al. .................. 706/3 |
| 6,608,638 B1 | * | 8/2003 | Kodosky et al. ............... 715/771 |
| 6,654,721 B2 | * | 11/2003 | Handelman .................... 704/270 |

(Continued)

FOREIGN PATENT DOCUMENTS

JP 09130783 A * 5/1997

(Continued)

OTHER PUBLICATIONS

Lenz, Reimar K; Tsai, Roger Y; "Techniques for Calibration of the Scale Factor and Image Center for High Accuracy 3-D Machine Vision Metrology", p. 713-720, 1998 IEEE retrieved Aug. 16, 2005.*

(Continued)

*Primary Examiner* — Philip Wang

(57) ABSTRACT

A system and method is provided for remotely analyzing machine vision data. An indication of a choice of vision software is sent from a first computer to a remote second computer. The second computer, using the selected vision software, processes image data to provide a result that is transmitted from the second computer to a designated location.

51 Claims, 6 Drawing Sheets

U.S. PATENT DOCUMENTS

| | | | |
|---|---|---|---|
| 6,763,515 B1 | 7/2004 | Vazquez et al. | |
| 6,781,724 B1 * | 8/2004 | Szajewski et al. | 358/487 |
| 6,798,531 B1 * | 9/2004 | Paz-Pujalt et al. | 358/1.15 |
| 6,813,621 B1 * | 11/2004 | Taylor et al. | 707/102 |
| 6,836,287 B1 * | 12/2004 | Nakahara | 348/211.12 |
| 6,915,273 B1 * | 7/2005 | Parulski | 705/26 |
| 6,931,602 B1 * | 8/2005 | Silver et al. | 715/771 |
| 6,931,633 B1 * | 8/2005 | Vazquez et al. | 717/131 |
| 6,944,584 B1 | 9/2005 | Tenney et al. | |
| 7,034,825 B2 | 4/2006 | Stowe et al. | |
| 7,092,860 B1 * | 8/2006 | Wasserman | 703/5 |
| 7,218,776 B2 * | 5/2007 | Sowinski et al. | 382/162 |
| 7,305,114 B2 | 12/2007 | Wolff et al. | |
| 7,383,536 B1 | 6/2008 | Petry et al. | |
| 2001/0031102 A1 * | 10/2001 | Lunetta et al. | 382/284 |
| 2001/0055069 A1 * | 12/2001 | Hudson | 348/302 |
| 2002/0055947 A1 | 5/2002 | Schultz et al. | |
| 2002/0075524 A1 * | 6/2002 | Blair et al. | 358/442 |
| 2002/0083413 A1 | 6/2002 | Kodosky et al. | |
| 2003/0055745 A1 * | 3/2003 | Kim | 705/26 |
| 2004/0005396 A1 * | 1/2004 | McCall et al. | 426/549 |
| 2004/0100465 A1 * | 5/2004 | Stowe et al. | 345/427 |
| 2006/0053407 A1 | 3/2006 | Kodosky et al. | |

FOREIGN PATENT DOCUMENTS

| | | | |
|---|---|---|---|
| JP | 2000115619 | | 4/2000 |
| JP | 2000115619 A | * | 4/2000 |
| WO | 0215120 | | 2/2002 |
| WO | WO 0235469 A2 | * | 5/2002 |

OTHER PUBLICATIONS

Niederl, Franz; Goller, Alois; "Method Execution on a Distributed Image Processing Back-end", p. 243-249, 1998 IEEE, retrieved Aug. 16, 2005.*

Parvin, B; Taylor, J; Cong, G; "A Collaborative Framework for Distributed Microscopy", p. 1-16, 1998 IEEE, retrieved Aug. 16, 2005.*

Trask, Bruce; "Using CORBA Asynchronous Messaging, Pluggable Protocols and the Real-Time Event Service in a Real-Time Emedded System", p. 1-9, <URL http://www.omg.org > search—http://ww.scholar.google.com, retrieved Aug. 16, 2005.*

Edwards, J., "Machine vision and its integration with CIM systems in the electronics manufacturing industry", Feb. 1999, Computer-Aided Engineering Journal, vol. 7, Issue 1, pp. 12-18.*

Gedeon et al., "Applying Machine Vision in Electrical Component Manufacturing", Electrical Electronics Insulation Conference and Electrical Manufacturing & Coil Winding Conference, 1993. Proceedings., Chicago '93 EEIC/ICWA Exposition Oct. 4-7, 1993 pp. 737-749.*

Kassim et al., "Automatic IC orientation checks", Spring-Verlag 2000, April, Machine Vision and Application, pp. 107-112.*

Comaniciu, "Image-guided decision support system for pathology", Spring-Verlag 2000, Machine Vision and Application, pp. 213-224.*

Remote Desktop Services From Wikipedia, the free encyclopedia, Remote Desktop Services, formerly known as Terminal Services, pre-2000.

Cognex Corporation, MVS-8000 Product Family Software Overview, 2000.

Cognex Corporation, MVS-8000 Series, Amazon SMD Programmer's Guide, 1999.

Cognex Corporation, VPRO 0.7, Diagnostic Display, 2000.

AT&T Laboratories, Virtual Network Computing—Diagnostic Display, http://www.hep.phy.cam.ac.uk/vnc_docs/index.html, Publication Date 2000.

Cognex Corporation, In-Sight Support and Learning Programs, www.cognex.com/support/insight, 2000.

Ho, Yeuk Fai, Model-based image processing: Analysis, Modeling, simulation and application, Abstract retrieved from ProQuest Jun. 19, 2006.

Telnet From Wikipedia, the free encyclopedia, TELNET (TErminaL NETwork) is a network protocol used on the Internet or local area networks, 1973.

X Window System From Wikipedia, the free encyclopedia, The X Window System (commonly X or X11), 1984.

Muscedere, Roberto, et al, A multiple in-camera processing system for machine vision, Abstract retrieved from Proquest Jun. 19, 2006.

Cognex Corporation, Cognex 8000—Machine Vision System, CVL User's Guide, CVL 4.7 590-6162, 1998.

Rogers, Richard, et al, The ISL Document Image Analysis Toolbox, IEEE retrieved Jun. 19, 2006, publication date 1997.

Robertson, Paul, et al, Adaptive Image Analysis for Aerial Surveillance, IEEE retrieved Jun. 19, 2006.

* cited by examiner

OPTIMIZED DISTRIBUTION OF MACHINE VISION PROCESSING

This is a Continuation National application Ser. No. 09/750,173 filed Dec. 29, 2000 now abandoned.

BACKGROUND OF THE INVENTION

1. Copyright Notice

This patent document contains information subject to copyright protection. The copyright owner has no objection to the facsimile reproduction by anyone of the patent document or the patent, as it appears in the U.S. Patent and Trademark Office files or records, but otherwise reserves all copyright rights whatsoever.

2. Field of the Invention

Aspects of the present invention generally relate to machine vision. Other, aspects of the present invention relate to providing access to the results of machine vision operations.

3. Description of Background Information

Machine vision technology is used around the world to automatically gauge part dimensions, guide robotic equipment, identify products, and inspect for defects in industries that include, but are not limited to, semiconductors, electronics, automotive parts, consumer products, electrical components, medical devices, and packaging. FIG. 2, for example, illustrates a machine vision system 200 in which an image acquisition subsystem 202, positioned on a production line, captures and stores an image of the part to be inspected. A machine vision computer 204 then uses machine vision image and data analysis software to extract information from the image and to produce a result that can be used to make decisions about the image. Once the vision system has processed and analyzed the image, the result 206 is communicated to the operator, or, as illustrated, to other manufacturing equipment 208 on the factory floor. The result may be used to control manufacturing equipment or to determine the quality of a part, or it may be input to another image analysis operation.

The machine vision software on computer 204 performs image analysis operations. Examples of image analysis operations include, but are not limited to, pattern location algorithms, gauging algorithms, character recognition algorithms, and image filters such as a Gaussian filter.

Suppliers of machine vision software may protect their software from unauthorized duplication by using a hardware or software security method. In addition, or as a substitute for hardware or software security methods, users of machine vision may be forced to support awkward licensing schemes imposed by machine vision vendors in an effort to protect their software from unauthorized use or duplication. Depending on the type of security used, licensees may be required to pay for licenses not needed to support their usage.

In addition, machine vision systems are difficult to maintain in the field. For instance, it may be challenging to update a machine vision system with a new version of software, or a new license, after it has been installed on a manufacturing production line. Moreover, customers wishing to test proprietary machine vision software on a particular part may be required to purchase and install software and the associated licenses, which is a significant deterrent to "quick-turn" software development.

To be more specific vendors may use one of the following three security methods to prevent improper copying or use of their software:

Hardware security may be employed. For example, a security code may be programmed into a hardware device, such as EEPROM on a frame grabber; or a hardware dongle which plugs into a parallel port. The machine vision software would check whether the required security code is present before executing a protected algorithm.

Dedicated software security may be employed. For example, protected software may be registered on a specific computer that is associated with a unique identifier on the computer, such as a hard disk serial number or an Ethernet address. Any attempt to copy the protected software to another computer would fail if that computer does not have the same unique identifier.

Floating licenses may be employed. For example, licenses are granted from a central computer on a network. Other computers on the network must request and be granted a license in order to fun the protected software. When the computers are finished, they typically release the license so that other computers can use the license. A fixed number of licenses are issued, so if all the licenses are being utilized, the computer requesting a license must wait until the license is freed by another computer.

These security methods present numerous problems that hinder the use of machine vision. The hardware and dedicated security methods are awkward to manage, and do not readily permit sharing of licenses among multiple computers. Floating licenses are subject to problems if the license server or any computer with a license crashes or goes of the network, or if the network itself ceases operation. Also, floating licenses do not readily handle inconsistent loads, i.e., periods of relative inactivity followed by periods when there are more requests for licenses than there are licenses. To accommodate these inconsistent loads, users must purchase additional licenses which are unused for significant portions of time, or queue up license requests.

Additionally, these security methods make it difficult for users of machine vision software to efficiently maintain the latest version of software because the user must explicitly install the software on each computer that needs to run the latest version of software. This is often difficult once a computer has been installed at a manufacturing facility. It may also be difficult to install bug fixes, patches and service releases which fix problems with older versions of the software. Customers must also track which versions of software and patches they have installed one each computer. In addition, computers using hardware or dedicated software security may need to update their licenses in the field if the new software requires additional license permission in order to run.

SUMMARY

Per one embodiment herein, a method is provided. A user selects, at a first computer, at least one vision tool. The vision tool is remotely located from the first computer. In response to the selection by the user of the at least one vision tool, data is sent including image data, an indication of the vision tool that was selected by the user, and at least one vision tool parameter corresponding to the vision tool. The data is sent, via a communications network, from the first computer to a remotely located second computer that includes the vision tool. The image data and the at least one vision tool parameter are validated, at the remotely located second computer. The image data is processed at the remotely located second computer using the vision tool to produce a result. The result is sent to a designated location.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

In embodiments herein, features are provided to permit users to pay for only the machine vision software that they need, when they need it, without limitations of licensing schemes. Features are also disclosed to facilitate customers' access to the latest version of machine vision software, without having to install the update on every computer. System and method features are also disclosed to allow users to test machine vision software, without having to purchase or license the software, in order to determine whether the software meets their requirements. Improved systems and methods, and subsystems and submethods, are provided to achieve one or more of these objects. Others will become apparent from the description that follows.

The present invention, in one variation, is directed to a system or method for performing machine vision operations on a remotely accessed computer. A first computer acquires image data and transfers it to a remotely located second computer via network. The first computer specifies, by communicating to the second computer over the network, information identifying selected vision software comprising a computer vision program or one or more specific vision tools for the second computer to run on the acquired image data. The first computer also sends to the second computer parameters needed by the second computer to run the selected vision software. The second computer runs the selected vision software on the transferred image to obtain a result. The result is sent from the second computer to a designated location.

DETAILED DESCRIPTION

Figure 1:
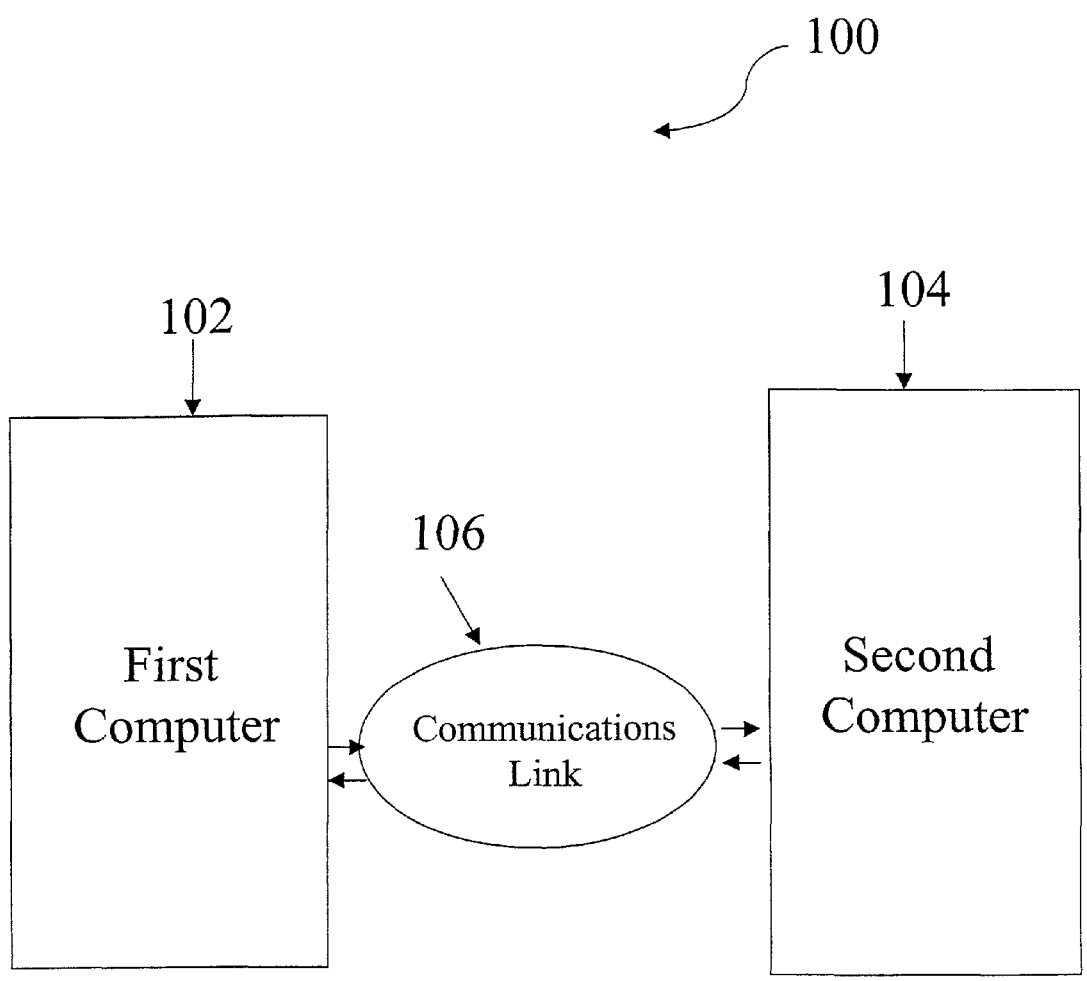
FIG. 1 illustrates an embodiment of the present invention.
Figure 2:
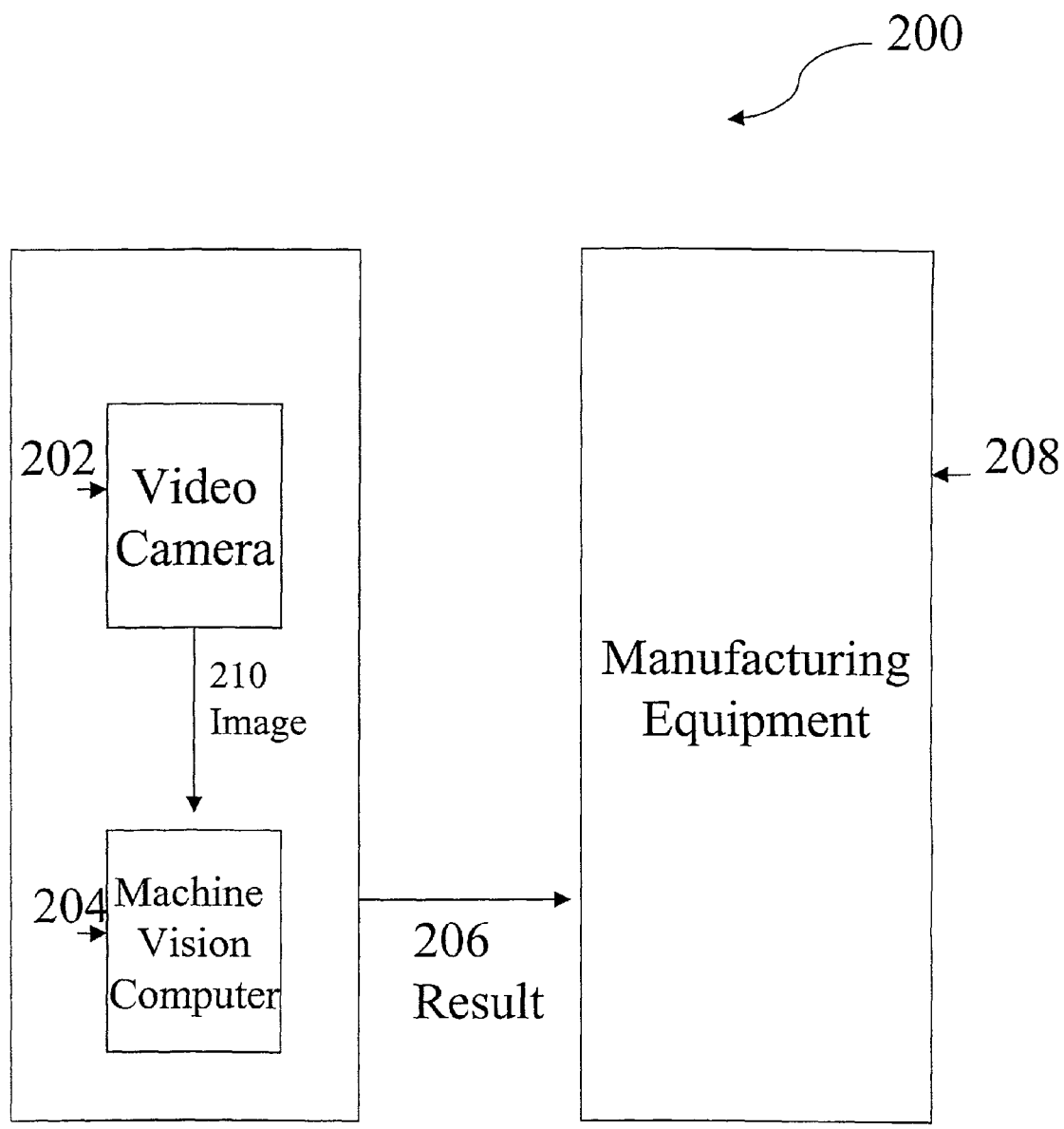
FIG. 2 illustrates a prior art machine vision system.

FIG. 1 is a diagram illustrating an embodiment of a networked machine vision system 100. The illustrated system 100 includes a first (collector) computer 102, a second analyzer) computer 104, and a communications link (an internetwork) 106. In the system of FIG. 1, image data is sent from first computer 102 to remotely located second computer 104 via communications link 106. Vision tool parameters may also be sent, if needed, from first computer 102 to remotely located second computer 104. Second computer 104 analyzes the image data and any given vision tool parameters that may be sent, using a chosen vision tool to produce a given result. The result is sent from second computer 104 to first computer 102 via the communications link 106. The communications link located between the first and second computer may be an Internet connection or wide area network (WAN) connection.

Figure 3:
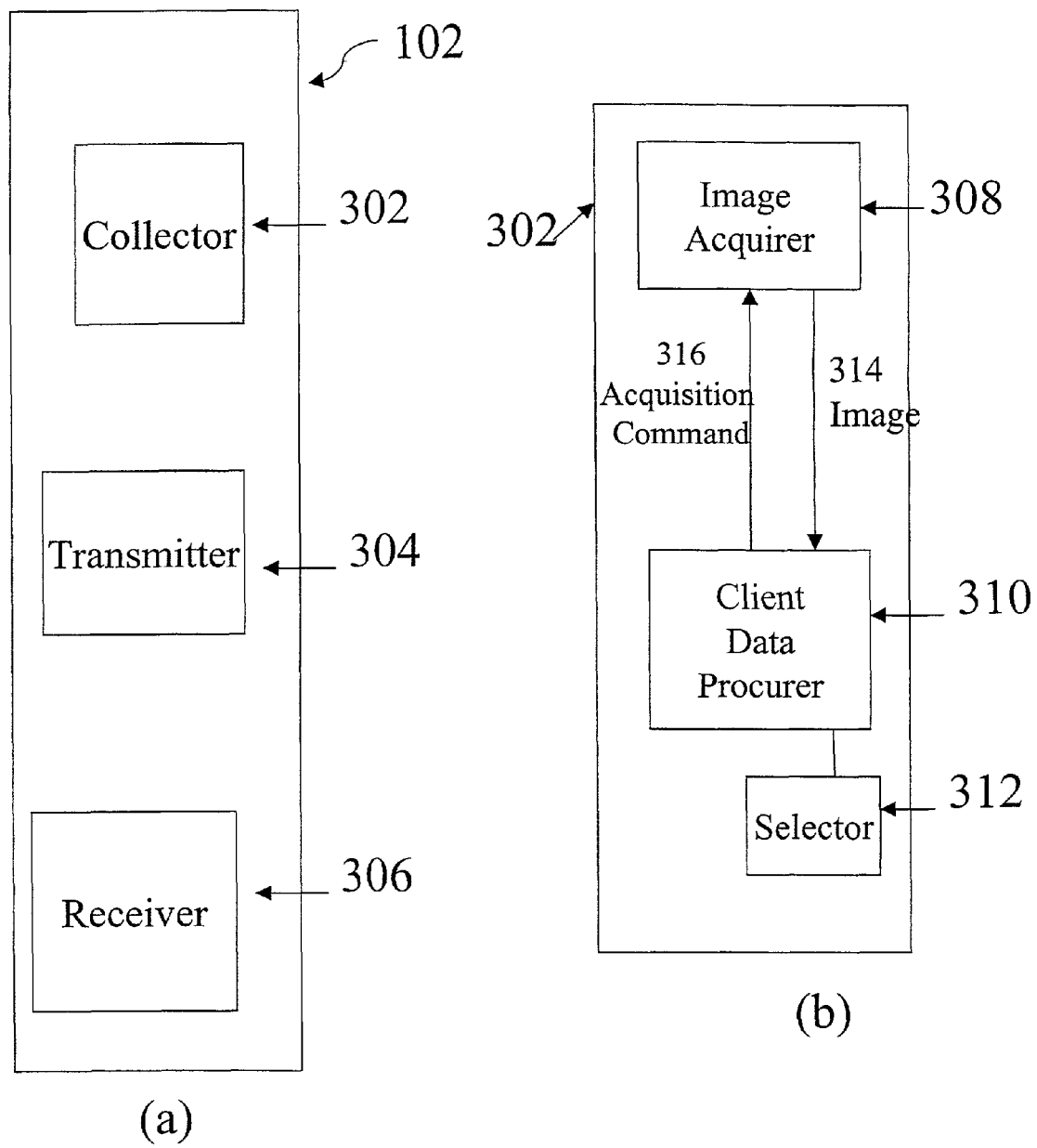
FIGS. 3(a) and 3(b) illustrates an embodiment of the invention in which a first computer arrangement is shown.

FIG. 3 (a) illustrates an arrangement of the first computer 102 in an embodiment of the present invention. First computer 102 includes a collector 302, a transmitter 304, and a receiver 306. FIG. 3 (b) further shows collector 302 of FIG. 3(a). Collector 302 includes an image acquirer 308, for example, a frame grabber, client data procurer 310, and selector 312. Collector 302 may uses a protocol such as DCOM (Distributed Component Object Model) or CORBA (Common Object Request Broker Architecture), to provide a standard method for inter-process communication in a heterogeneous environment. DCOM and CORBA are examples of distributed object computing infrastructures which automate many common network programming tasks such as object registration, location, and activation, request demultiplexing, framing and error-handling, parameter marshalling and demarshalling, and operation dispatching. Client data procurer 310 sends an acquisition command 316 to image acquirer 308 to acquire an image 314.

The image acquirer 308 may be stored on first computer 102 or remote from first computer 102 such that image acquirer 308 used to acquire the image data may be local or networked. Software demonstration image data may be stored at second computer 104 or on a computer connected to second computer 104. The source of the image may include a camera, x-ray, scanning electron microscopes or focused ion beams. Image acquirer 308 responds to the acquisition command 316 by returning an image 314 to client data procurer 310. Next, selector 312 selects a vision operation tool to be used to analyze the image 314. Multiple vision tools may be indicated by selector 312. The selected vision tool may include such vision operations as guidance, inspection, gauging or identification. Most vision operations require additional parameters to precisely specify their behavior, and correspond with the selected vision tool; however, these additional parameters may not be needed in every case. The corresponding parameters for the selected vision tools may include, for example: in a guidance operation, a model pattern and constraints on the alignment operation such as minimum match quality and allowable scale and rotation change; or in a gauging operation the corresponding parameter may include the polarity of an edge transition, the expected angle of the edge, the type of scoring operation to perform or the minimum edge intensity.

Vision tool parameters that correspond to the selected vision tool may be entered manually at the first computer 102, for example, by using a keyboard, mouse, or touchpad in a software demonstration scenario. The vision tool parameters may also be entered, for example in a manufacturing or production environment, using a keyboard, mouse, touchpad, or an application program in collector 302. The acquired image data 314, vision tool parameters (if any), and the selected vision tool are sent by transmitter 304 to second computer 104 to be analyzed using the selected vision tool. The data transmitted by transmitter 304 may also contain information such as client account information or a password. The image data 314 may be transmitted using a format such as JPEG or .bmp file. The receiver 306 is used to receive an analyzed result of the selected vision tool from the second computer 104.

Figure 4:
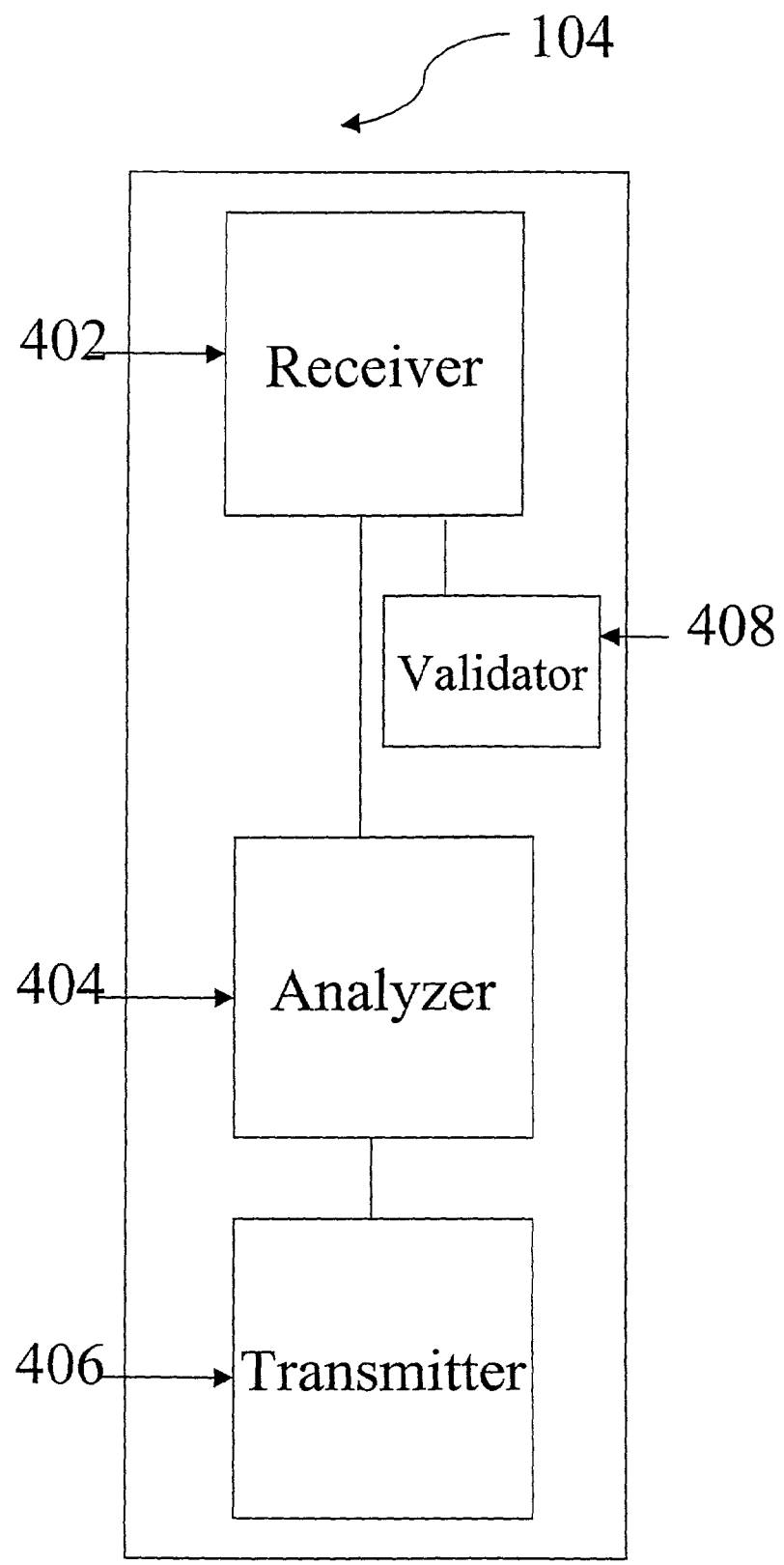
FIG. 4 illustrates an embodiment of the invention in which a second computer arrangement is shown.

FIG. 4 illustrates an arrangement of the second computer 104 in an embodiment of the present invention. Second computer 104 includes a receiver 402, a validator 408, an analyzer 404, and a transmitter 406. Receiver 402 receives the information and data transmitted from the first computer 102. The received information includes acquired image data, corresponding vision tool parameters (if any), the selected vision tool, and client identifiers. Once the information is received on receiver 402, the information and data are verified by validator 408. Validator 408 functions to ensure client account security so that client identifiers such as account information and passwords are verified. The image data and vision tool parameters (if any) may be verified within the selected vision tool or by a validator independent from validator 408. If an incorrect client identifier entry is received, validator 408 will return an error message to first computer 102. Once the received client identifier information is verified by validator 408, analyzer 404 uses the selected vision tool to analyze the acquired image data and any corresponding vision tool parameters. If an invalid image or vision tool parameters have been provided by first computer 102, analyzer 404 will return an error result to first computer 102. Otherwise, if image data and vision tool parameters (if any) are valid, analyzer 404 will perform the selected vision operation to obtain an analyzed result. The analyzed result will be sent by transmitter 406 to a designated location. The designated location may include first computer 102 or a computer other than the first computer 102.

Figure 5:
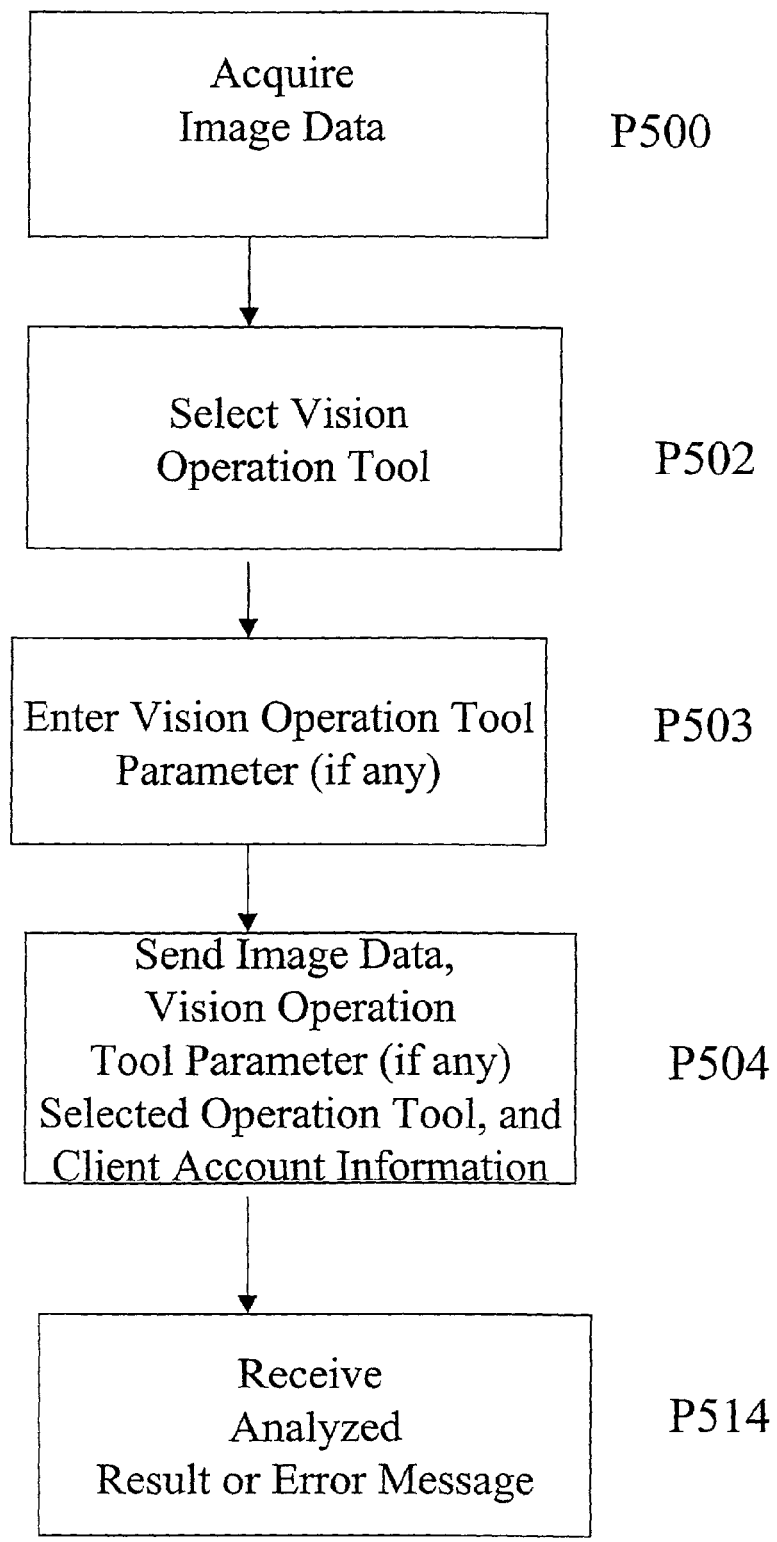
FIG. 5 is a flow diagram explaining the process of a first computer of the present invention.

FIG. 5 explains the operation of the first computer in an embodiment of the invention. At P500 first computer 102 acquires image data. The image may be acquired from a location remote from first computer 102 or stored at a location on first computer 102.

At P502 a vision operation tool is selected to analyze the acquired image. The selected vision operation tool is remotely located from the first computer 102—in a different part of the same building (site) at a different site, or in another part of the country (or world). Multiple vision operation tools may be selected to conduct various data analysis.

At P503 vision tool parameters, if any, are entered. The vision operation tools correspond to each vision tool selected at P502.

At P504 the acquired image data, selected vision tool(s), corresponding vision tool parameters (if any), and client account information are sent from first computer 102 to second computer 104 via a communications link 106.

At P514 an analyzed result or error message is received from second computer 104. The analyzed result or error message is obtained from the processing of the acquired image data and any corresponding vision tool parameters using the selected vision operation tool.

Figure 6:
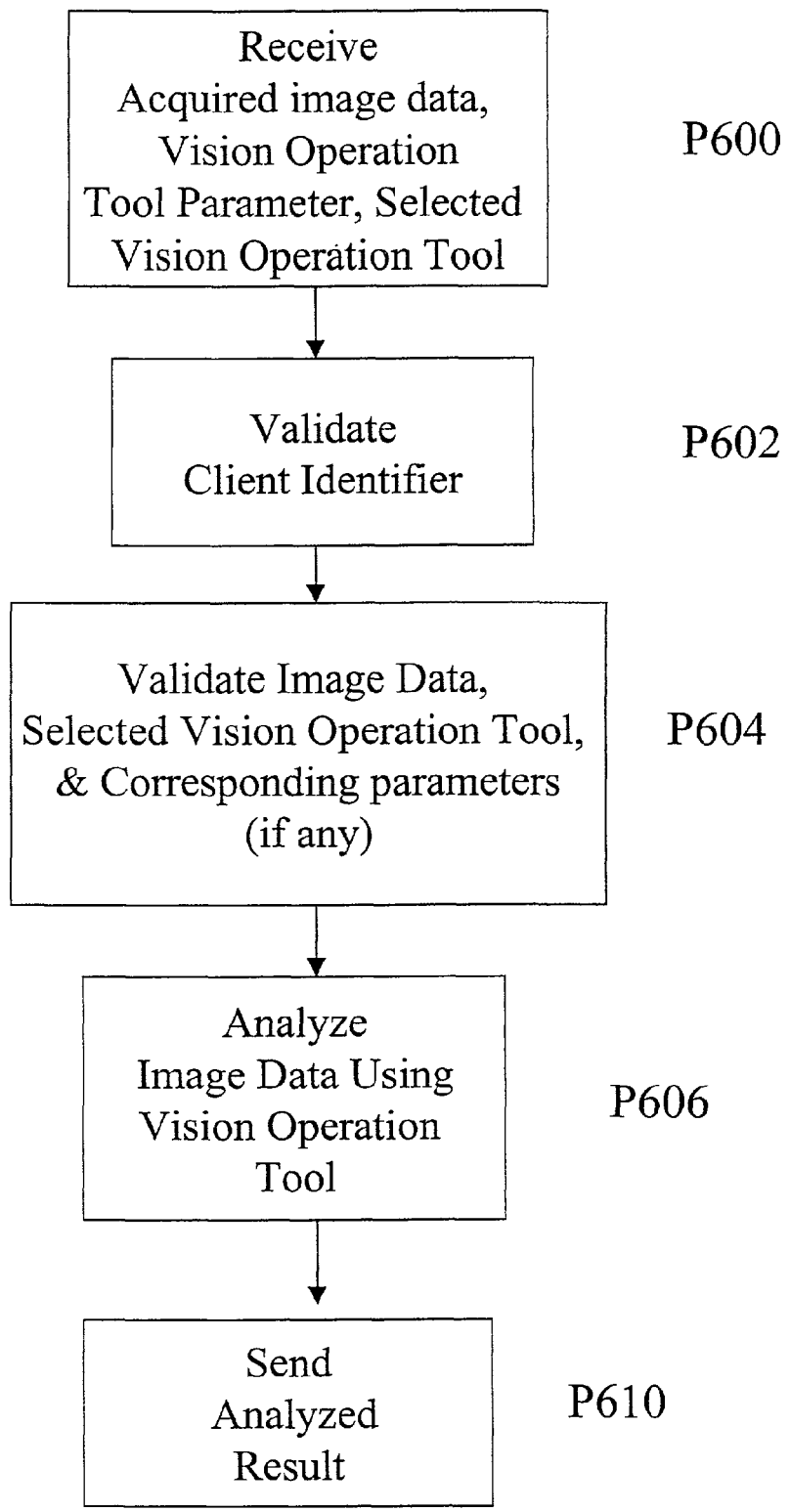
FIG. 6 is a flow diagram explaining the process of a second computer of the present invention.

FIG. 6 explains the operation of the second computer in an embodiment of the invention. At P600 acquired image data, a selected vision tool, vision tool parameters (if any), and client account information are received from first computer 102.

At P602 the client account information received at P600 is validated. The validation maintains client account security by verifying that a correct client identifier and password have been entered. If any information fails to be validated, an error message is sent to the first computer 102.

At P604 the image data, vision tool and any vision tool parameters are verified to ensure that the correct type, number and values required for the selected vision tool have been entered.

At P606 the acquired image data and any vision tool parameters are processed using the selected vision tool to produce an analyzed result.

At P610 the analyzed result is sent from the second computer 104 to a designated location via a communications link. The designated location may include the first computer 102 or a location other than the first computer 102. The communications link 106, as discussed above, may include an Internet connection or a wide area network (WAN) connection.

If more than one vision tool is selected, the second computer 104 may execute P604, P606 and P610 in turn for each selected vision tool.

The present invention may be implemented by hardware or by a combination of hardware and software. The software may be recorded on a medium and executed by a computer. The medium may be, but is not limited to, for example, a floppy disk, a CD ROM, a writable CD, a Read-Only-Memory (ROM), or an Electrically Erasable Programmable Read Only Memory (EEPROM).

While the invention has been described with reference to certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not limited to the particulars disclosed, but rather extends to all equivalent structures, acts, and materials, such as are within the scope of the appended claims.

What is claimed is:

1. Apparatus comprising:
   a collector computer including a vision tool selector configured to select, via a manual entry interface at the collector computer, at least one chosen vision tool and, from among plural selectable vision tools, corresponding vision tool parameters corresponding to the chosen vision tool;
   a transmitter configured to send, from the collector computer to a machine vision engine located remotely from the collector computer and via a communications network, (i) image data including at least one given image to be analyzed by the chosen vision tool, and (ii) the corresponding vision tool parameters; and
   wherein the machine vision engine is remote from the computer and includes selectable vision tools including the chosen vision tool, the selectable vision tools having been configured to, when selected, carry out vision operations including pattern location on the given image.

2. The apparatus according to claim 1, wherein the machine vision engine includes machine vision software encoded on computer-readable media and executed by a computer.

3. The apparatus according to claim 1, wherein the vision operations include guidance.

4. The apparatus according to claim 1, wherein the vision operations include inspection.

5. The apparatus according to claim 1, wherein the vision operations include gauging.

6. The apparatus according to claim 1, wherein the vision operations include identification.

7. The apparatus according to claim 1, wherein the vision operations include a selectable guidance vision tool configured to, when selected, (i) obtain guidance operation vision tool parameters including a model pattern and alignment operation constraints, and (ii) carry out a corresponding guidance operation corresponding to the obtained guidance operation vision tool parameters.

8. The apparatus according to claim 7, wherein the alignment operation constraints include parameters defining a minimum match quality and allowable scale and rotation change.

9. The apparatus according to claim 1, wherein the vision tool parameters input includes a keyboard of the computer.

10. The apparatus according to claim 1, wherein the vision tool parameters input includes a mouse of the computer.

11. The apparatus according to claim 1, wherein the vision tool parameters input includes a touch pad of the computer.

12. The apparatus according to claim 1, wherein the vision tool parameters input is configured to receive the corresponding vision tool parameters via manual entry at the computer.

13. The apparatus according to claim 12, wherein the manual entry is via a manual entry interacting with an application program run on the computer.

14. The apparatus according to claim 13, wherein the vision tool parameters input is located in a manufacturing environment.

15. The apparatus according to claim 1, wherein the computer includes the transmitter.

16. The apparatus according to claim 1, wherein the communications network includes an internetwork.

17. The apparatus according to claim 16, wherein the internetwork includes the Internet.

18. The apparatus according to claim 1, wherein the given image includes an image file.

19. The apparatus according to claim 18, wherein the image file includes a JPEG file.

20. The apparatus according to claim 18, wherein the image file includes a bmp file.

21. The apparatus according to claim 1, wherein the transmitter is configured to send, via the communications network, an indication of the selected one or more given vision tools.

22. The apparatus according to claim 1, wherein the machine vision engine includes machine vision software encoded on computer-readable media and executed by a computer.

23. The apparatus according to claim 1, wherein the vision operations include guidance.

24. The apparatus according to claim 1, wherein the vision operations include inspection.

25. The apparatus according to claim 1, wherein the vision operations include gauging.

26. The apparatus according to claim 1, wherein the vision operations include identification.

27. The apparatus according to claim 1, wherein the vision operations include a selectable guidance vision tool configured to, when selected, (i) obtain guidance operation vision tool parameters including a model pattern and alignment operation constraints, and (ii) carry out a corresponding guidance operation corresponding to the obtained guidance operation vision tool parameters.

28. The apparatus according to claim 27, wherein the vision tool parameters include parameters defining a minimal match quality and allowable scale and rotation change.

29. The apparatus according to claim 1, further comprising a client data procurer configured to send an image acquisition command to an image acquirer to acquire image data including the given image data.

30. The apparatus according to claim 1, further comprising a receiver configured to receive results data originating from the machine vision engine, the results data including a result of the machine vision engine having analyzed, with the selected one or more given vision tools, the given image sent by the transmitter in accordance with the corresponding vision tool parameters sent by the transmitter.

31. The apparatus according to claim 30, wherein the collector computer includes the receiver.

32. The apparatus according to claim 1, further comprising an image acquirer configured to capture and store an image of a part.

33. The apparatus according to claim 32, wherein the image acquirer includes a frame grabber.

34. The apparatus according to claim 32, wherein the image acquirer is positioned on a production line.

35. The apparatus according to claim 32, further comprising the machine vision engine.

36. Apparatus comprising:
a computer including a receiver configured to receive, from a remote source via a communications network, image data including at least one given image to be analyzed by one or more given vision tools that have been selected, and corresponding vision tool parameters corresponding to the selected one or more given vision tools that have been selected to analyze the given image;
the computer being configured to, following receiving certain data by the receiver, cause a machine vision engine to analyze, with the selected one or more given vision tools, the given image to be analyzed in accordance with the corresponding vision tool parameters received by the receiver; and
wherein the machine vision engine includes the set of individually selectable vision tools having been configured to, when selected, carry out vision operations including pattern location.

37. The apparatus according to claim 36, wherein the vision operations include guidance.

38. The apparatus according to claim 37, wherein the communications network includes an internetwork.

39. The apparatus according to claim 38, wherein the internetwork includes the Internet.

40. The apparatus according to claim 36, wherein the vision operations include inspection.

41. The apparatus according to claim 36, wherein the vision operations include gauging.

42. The apparatus according to claim 36, wherein the vision operations include identification.

43. The apparatus according to claim 36, wherein the vision operations include a selectable guidance vision tool configured to, when selected, (i) obtain guidance operation vision tool parameters including a model pattern and alignment operation constraints, and (ii) carry out a corresponding guidance operation corresponding to the obtained guidance operation vision tool parameters.

44. The apparatus according to claim 43, wherein the obtained guidance operation vision tool parameters include parameters defining a minimum match quality and allowable scale and rotation change.

45. The apparatus according to claim 36, wherein the computer includes the machine vision engine.

46. The apparatus according to claim 36, wherein the selected one or more given vision tools that have been selected have been selected at a location remote from the computer.

47. The apparatus according to claim 36, further comprising a validator configured to verify associated validation data to ensure client account security, the associated validation data having been associated with the received given image, the selected one or more given vision tools, and the corresponding vision tool parameters.

48. The apparatus according to claim 47, wherein the associated validation data has been received by the receiver.

49. A system comprising:
a computer in a manufacturing facility, the computer including a vision tool parameters input configured to receive, at the computer, corresponding vision tool parameters corresponding to at least one of selected one or more given vision tools;
a transmitter configured to send, from the computer to a machine vision engine located remotely from the computer and via a communications network, (i) image data including at least one given image to be analyzed by the selected one or more given vision tools, and (ii) the corresponding vision tool parameters; and
wherein the machine vision engine includes selectable vision tools including the selected one or more given vision tools, the selectable vision tools having been configured to, when selected, carry out vision operations including pattern location on the given image.

50. A method comprising:
receiving, at a computer including a vision tool parameters input, corresponding vision tool parameters corresponding to at least one of selected one or more given vision tools;
a transmitter sending, from the computer to a machine vision engine located remotely from the computer and via a communications network, (i) image data including at least one given image to be analyzed by the selected one or more given vision tools, and (ii) the corresponding vision tool parameters; and
wherein the machine vision engine is remote from the computer and includes selectable vision tools including the selected one or more given vision tools, the selectable vision tools having been configured to, when selected, carry out vision operations including pattern location on the given image.

51. Computer-readable media encoded with data, the data, when interoperably read by a computer, causing:
receiving, at a computer including a vision tool parameters input, corresponding vision tool parameters corresponding to at least one of selected one or more given vision tools;
a transmitter sending, from the computer to a machine vision engine located remotely from the computer and via a communications network, (i) image data including at least one given image to be analyzed by the selected one or more given vision tools, and (ii) the corresponding vision tool parameters; and
wherein the machine vision engine is remote from the computer and includes selectable vision tools including the selected one or more given vision tools, the selectable vision tools having been configured to, when selected, carry out vision operations including pattern location on the given image.

* * * * *